US010679793B2

(12) United States Patent
Suzuki

(10) Patent No.: US 10,679,793 B2
(45) Date of Patent: Jun. 9, 2020

(54) ROLL-UP TYPE CAPACITOR AND PROCESS FOR PRODUCING THE SAME

(71) Applicant: Murata Manufacturing Co., Ltd., Nagaokakyo-shi, Kyoto-fu (JP)

(72) Inventor: Shoichiro Suzuki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 109 days.

(21) Appl. No.: 15/949,227

(22) Filed: Apr. 10, 2018

(65) Prior Publication Data

US 2018/0233291 A1    Aug. 16, 2018

Related U.S. Application Data

(63) Continuation of application No. PCT/JP2016/000587, filed on Feb. 4, 2016.

(51) Int. Cl.
*H01G 4/32* (2006.01)
*H01G 4/012* (2006.01)
(Continued)

(52) U.S. Cl.
CPC ............ *H01G 4/32* (2013.01); *H01G 4/012* (2013.01); *H01G 4/015* (2013.01); *H01G 4/232* (2013.01); *H01G 4/38* (2013.01); *H01G 4/18* (2013.01)

(58) Field of Classification Search
CPC ........ H01G 4/32; H01G 4/012; H01G 4/18;qa H01G 4/232; H01G 4/015; H01G 4/38
See application file for complete search history.

(56) References Cited

U.S. PATENT DOCUMENTS 3,891,901 A * 6/1975 Booe ............... H01G 4/232
                                                        361/309
4,654,751 A * 3/1987 Tokura ............. H01G 2/12
                                                        361/323
(Continued)

FOREIGN PATENT DOCUMENTS

DE   102015219696 A1 * 4/2016   ............. H01G 4/32
EP     2023357 A1     2/2009
(Continued)

OTHER PUBLICATIONS

International Search Report issued in International Application No. PCT/JP2016/000587, dated Sep. 28, 2016.
(Continued)

*Primary Examiner* — David M Sinclair
(74) *Attorney, Agent, or Firm* — Arent Fox LLP

(57) ABSTRACT

A roll-up type capacitor that includes a plurality of cylindrical parts arranged parallel to one another and which each are a rolled-up laminate; a first external electrode on respective first ends of the plurality of cylindrical parts; and a second external electrode on respective second ends of the plurality of cylindrical parts. When, prior to being rolled-up, a dimension of the laminate parallel to a rolling-up direction is a length L, and a dimension of the laminate perpendicular to laminating direction and the rolling-up direction is a width W, the roll-up type capacitor has two or more cylindrical parts when a ratio L/W is 4 or more; has three or more cylindrical parts when L/W is 3 to less than 4; has four or more cylindrical parts when L/W is 2 to less than 3; and has eight or more cylindrical parts when L/W is 1 to less than 2.

18 Claims, 9 Drawing Sheets

(51) Int. Cl.
*H01G 4/38* (2006.01)
*H01G 4/015* (2006.01)
*H01G 4/232* (2006.01)
*H01G 4/18* (2006.01)

(56) References Cited

U.S. PATENT DOCUMENTS

| | | | |
|---|---|---|---|
| 5,615,075 A * | 3/1997 | Kim | G01R 15/202 |
| | | | 324/117 H |
| 5,725,909 A | 3/1998 | Shaw et al. | |
| 6,420,003 B2 | 7/2002 | Shaw et al. | |
| 8,136,213 B2 | 3/2012 | Schmidt | |
| 8,861,184 B2 | 10/2014 | Schmidt | |
| 2001/0001284 A1 | 5/2001 | Shaw et al. | |
| 2003/0142457 A1 * | 7/2003 | Eriksson | H01G 4/224 |
| | | | 361/301.5 |
| 2003/0142461 A1 | 7/2003 | Decker et al. | |
| 2005/0118733 A1 | 6/2005 | Schmidt et al. | |
| 2005/0263845 A1 * | 12/2005 | Saito | H01G 2/10 |
| | | | 257/516 |
| 2007/0159767 A1 * | 7/2007 | Jamison | H01G 4/012 |
| | | | 361/301.5 |
| 2009/0046414 A1 | 2/2009 | Schmidt | |
| 2010/0202095 A1 * | 8/2010 | Kyouda | H01G 2/106 |
| | | | 361/301.3 |
| 2012/0140379 A1 | 6/2012 | Schmidt | |
| 2014/0036405 A1 * | 2/2014 | Takeoka | H01G 4/005 |
| | | | 361/273 |

FOREIGN PATENT DOCUMENTS

| | | |
|---|---|---|
| EP | 2676281 B1 * | 12/2014 |
| JP | S55173131 U | 12/1980 |
| JP | H05121268 A | 5/1993 |
| JP | H08512256 A | 12/1996 |
| JP | 2005516387 A | 6/2005 |
| JP | 2009218285 A * | 9/2009 |
| WO | 2010007110 A2 | 1/2010 |
| WO | 2016058980 A1 | 4/2016 |

OTHER PUBLICATIONS

Written Opinion of the International Searching Authority issued in International Application No. PCT/JP2016/000587, dated Sep. 28, 2016.

Ravikant Sharma et al., "Large-Area Rolled-Up Nanomembrane Capacitor Arrays for Electrostatic Energy Storage," Advanced Energy Materials, vol. 4, No. 9, Jun. 24, 2014.

* cited by examiner

ROLL-UP TYPE CAPACITOR AND PROCESS FOR PRODUCING THE SAME

CROSS REFERENCE TO RELATED APPLICATIONS

The present application is a continuation of International application No. PCT/JP2016/000587, filed Feb. 4, 2016, the entire contents of which are incorporated herein by reference.

FIELD OF THE INVENTION

The present invention relates to a roll-up type capacitor and a process for producing this capacitor.

BACKGROUND OF THE INVENTION

With development of high density mounting structure of electronic devices in recent years, demands for a higher-capacitance and smaller-sized capacitor are increasing. An example of a process for producing this type of capacitor disclosed in EP 2023357 A includes: a step for producing a laminate on a substrate, the laminate containing at least two electric conductive layers, and at least one electric insulating layer sandwiched between the two electric conductive layers; a step for mounting a first metal contact on an exposed area of a first electric conductive layer; a step for mounting a second metal contact on an exposed area of a second electric conductive layer; a step for separating a first part of the laminate from an initial position of the first part to shift the first part, the first part containing an edge portion of the laminate; and a step for bending the first part rearward toward a second part of the laminate.

R. Sharma et al., Advanced Energy Materials 4, 1301631 (2014), discloses a method for manufacturing self-rolled double-tube capacitors electrically connected in parallel.

SUMMARY OF THE INVENTION

According to the roll-up type capacitor disclosed in EP 2023357 A, an electrode terminal connected to an external electric element is formed at a final end of each of the rolled first electric conductive layer and second electric conductive layer (hereinafter collectively referred to as "electric conductive layers" as well). In the case of the roll-up type capacitor disclosed in EP 2023357 A, charges are drawn in a rolling direction of the electric conductive layers. In this case, equivalent series resistance (ESR) rises, in which condition capacitance in a high frequency range exceeding 100 kHz is difficult to obtain.

The double-tube capacitor disclosed in R. Sharma et al., Advanced Energy Materials 4, 1301631 (2014), can have increased capacitance. However, the it is likely to have increased ESR.

The present inventors have found that a roll-up type capacitor capable of decreasing ESR and usable in a preferable condition even in a high frequency range is realizable by producing a cylindrical part from a rolled laminate containing a lower electrode layer, a dielectric layer, and an upper electrode layer, and further by providing a pair of external electrodes connecting to other electric elements such that one and the other external electrodes are disposed at one and the other ends of the cylindrical part. However, with development of small-sized and high-performance electronic devices, a capacitor capable of achieving size reduction and a further decrease in ESR has been demanded.

An object of the present invention is to provide a roll-up type capacitor capable of decreasing ESR and usable in a smaller size even in a high frequency range, and a process for producing this roll-up type capacitor.

The present inventors have conducted intense examinations for solving the aforementioned problems, and developed the present invention based on the finding that a capacitor capable of decreasing ESR is realizable by arranging a plurality of cylindrical parts in parallel with one another, each of which cylindrical parts is produced from a rolled laminate containing a lower electrode layer, a dielectric layer, and an upper electrode layer, by providing a pair of external electrodes such that one and the other of the external electrodes are disposed at one and the other ends, respectively, of each of the plurality of cylindrical parts, and further by setting the size of the laminate and the number of the cylindrical parts to particular values.

A first aspect of the present invention is directed to a roll-up type capacitor comprising a plurality of cylindrical parts arranged in parallel with one another, each of which is produced from a rolled laminate including at least an upper electrode layer, a lower electrode layer, and a dielectric layer between the upper electrode layer and the lower electrode layer, each of which cylindrical parts being formed such that the upper electrode layer is drawn to one end of the cylindrical part, and that the lower electrode layer is drawn to the other end of the cylindrical part; a first external electrode disposed on first side ends of the plurality of cylindrical parts, and electrically connected to the upper electrode layers of the plurality of cylindrical parts; and a second external electrode disposed on second side ends of the plurality of cylindrical parts, and electrically connected to the lower electrode layers of the plurality of cylindrical parts. When a length of the laminate in a direction parallel with a rolling direction of the laminate is a length L, and that a width of the laminate in a direction perpendicular to a laminating direction and the rolling direction of the laminate is a width W, the roll-up type capacitor includes the two or more cylindrical parts when a ratio L/W is four or larger, the roll-up type capacitor includes the three or more cylindrical parts when the ratio L/W is three or larger and smaller than four, the roll-up type capacitor includes the four or more cylindrical parts when the ratio L/W is two or larger and smaller than three, and the roll-up type capacitor includes the eight or more cylindrical parts when the ratio L/W is one or larger and smaller than two.

A second aspect of the present invention is directed to a process for producing a roll-up type capacitor. The process comprises forming a sacrificial layer on a substrate; forming a plurality of laminates each including at least a lower electrode layer, an upper electrode layer, and a dielectric layer between the lower electrode layer and the upper electrode layer on the sacrificial layer; rolling up the laminate by removal of the sacrificial layer to obtain a plurality of cylindrical part; arranging the plurality of cylindrical parts in parallel with one another; forming a first external electrode on the first side ends of the plurality of cylindrical parts such that the first external electrode is electrically connected to the upper electrode layers of the plurality of cylindrical parts; and forming a second external electrode on the second side ends of the cylindrical parts such that the second external electrode is electrically connected to the lower electrode layers of the plurality of cylindrical parts. When a length of the laminate in a direction parallel with a rolling direction of the laminate is a length L, and a width of the laminate in a direction perpendicular to a laminating direction and the rolling direction of the laminate is a width W, the roll-up type capacitor includes the two or more cylindrical parts when a ratio L/W is four or larger, the roll-up type capacitor includes the three or more cylindrical parts when the ratio L/W is three or larger and smaller than four, the roll-up type capacitor includes the four or more cylindrical parts when the ratio L/W is two or larger and smaller than three, and the roll-up type capacitor includes the eight or more cylindrical parts when the ratio L/W is one or larger and smaller than two.

A roll-up type capacitor having the foregoing configuration according to the present invention is capable of decreasing ESR and usable in a preferable condition even in a high frequency range. A process for producing a roll-up type capacitor having the foregoing configuration according to the present invention produces a roll-up type capacitor capable of decreasing ESR and usable in a preferable condition even in a high frequency range.

DETAILED DESCRIPTION OF THE PREFERRED EMBODIMENTS

A roll-up type capacitor and a process for producing this roll-up type capacitor according to an embodiment of the present invention are hereinafter described in detail with reference to the drawings. However, respective shapes, positions and the like of the roll-up type capacitor and respective constituent elements included therein are not limited to specific configurations described and depicted in the following embodiments.

Figure 1:
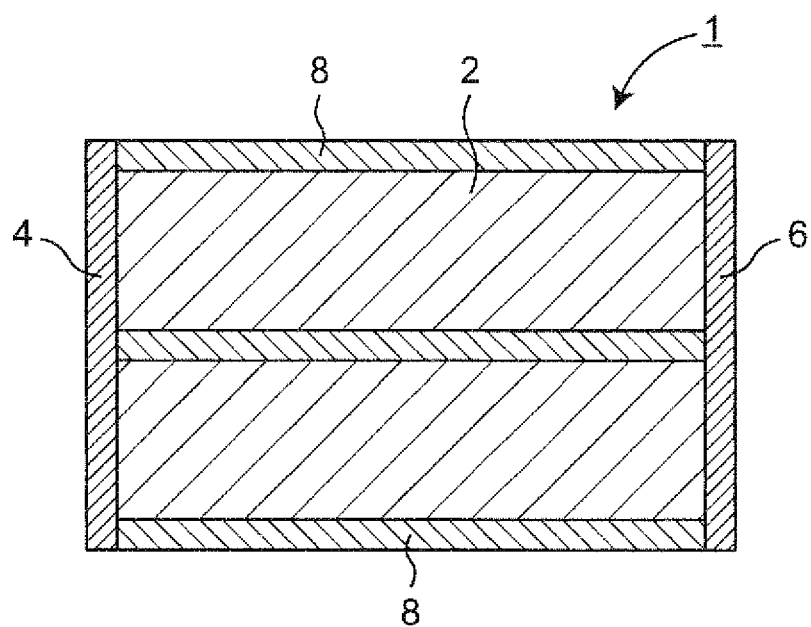
FIG. 1 is a schematic cross-sectional view of a roll-up type capacitor according to one embodiment of the present invention along a central axis of a cylindrical part therein.

As illustrated in FIG. 1, a roll-up type capacitor 1 according to an embodiment of the present invention generally includes a plurality of cylindrical parts 2 arranged in parallel with one another, a first external electrode 4 disposed at one side ends of the plurality of the cylindrical parts 2, and a second external electrode 6 disposed at the other side ends of the plurality of the cylindrical parts 2. The first external electrode 4 and the second external electrode 6 disposed at the one side ends and the other side ends of the cylindrical part 2, respectively, are so positioned as to face each other. The state that the plurality of cylindrical parts "arranged in parallel with one another" in this context refers to such a state that the two or more cylindrical parts are arranged with the central axes of the respective cylindrical parts extending in parallel with one another. The "end" of each of the cylindrical parts 2 in this context refers to an end (or surface) crossing the central axis of the corresponding cylindrical part 2. The roll-up type capacitor 1 may include a resin part 8 as illustrated in FIG. 1. However, the resin part 8 is not an essential constituent element. The roll-up type capacitor 1 according to this embodiment functions even when the resin part 8 is absent. According to the roll-up type capacitor 1 illustrated in FIG. 1, the area of each of the cylindrical parts 2 other than both ends thereof is covered by the resin part 8.

Figure 2:
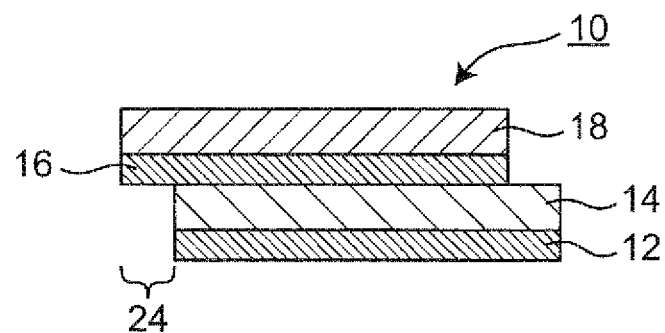
FIG. 2 is a schematic cross-sectional view of a laminate constituting the cylindrical part of the roll-up type capacitor perpendicular to the direction of the rolling-up.

Each of the cylindrical parts 2 is produced by rolling up a lower electrode layer 12 and an upper electrode layer 16 with at least a dielectric layer 14 sandwiched between the lower electrode layer 12 and the upper electrode layer 16. For example, the cylindrical part 2 is produced by rolling up a laminate 10 having a cross-sectional shape as illustrated in FIG. 2. According to the laminate 10 illustrated in FIG. 2, the lower electrode layer 12, the dielectric layer 14, and the upper electrode layer 16 are laminated in this order. As illustrated in FIG. 2, an insulating layer 18 may be laminated on the upper electrode layer 16. The insulating layer 18 is not an essential element in this embodiment, and thus is not required to be equipped when there is no possibility of electric contact between the lower electrode layer 12 and the upper electrode layer 16.

As illustrated in FIG. 2, the lower electrode layer 12 and the upper electrode layer 16 in the laminate 10 are disposed such that one end of each of the electrode layers 12 and 16 does not overlap with the other electrode layer. The laminate 10 thus constructed is rolled up into the cylindrical part 2 which contains the lower electrode layer 12 and the upper electrode layer 16 with at least the dielectric layer 14 sandwiched therebetween. According to the cylindrical part 2, the first external electrode 4 and the second external electrode 6 are disposed on the left side and the right side, respectively, of the laminate 10 illustrated in FIG. 2. In this arrangement, the upper electrode layer 16 is electrically connected to the first external electrode 4, and electrically separated from the second external electrode 6. Similarly, the lower electrode layer 12 is electrically connected to the second external electrode 6, and electrically separated from the first external electrode 4.

The roll-up type capacitor 1 according to this embodiment achieves considerable size reduction. For example, the thickness of the cylindrical part 2 may be 100 μm or smaller, preferably 50 μm or smaller, and more preferably 20 μm or smaller.

According to the roll-up type capacitor 1 of this embodiment, current linearly flows in a direction along the central axis of each of the cylindrical parts. In this case, the roll-up type capacitor 1 of this embodiment has a resonant frequency in a higher frequency range than the resonant frequency of a conventional roll-up type capacitor where current flows in a coil shape along a rolling direction. Accordingly, the roll-up type capacitor 1 of this embodiment is more appropriate for use in a high frequency range. Moreover, the roll-up type capacitor according to this embodiment includes the two or more cylindrical parts 2 arranged in parallel with one another, and the first external electrode 4 and the second external electrode 6 are formed at respective side ends of the two or more cylindrical parts 2. The structure connecting the two or more cylindrical parts 2 in parallel with one another via the external electrodes decreases inductance, and therefore has a resonant frequency in a higher frequency range. As a result, impedance for alternating current at a high frequency decreases.

ESR of a roll-up type capacitor varies in accordance with conditions such as the material and thickness of an electrode layer. When the roll-up type capacitor according to this embodiment has capacitance equivalent to the capacitance of a conventional roll-up type capacitor including only one cylindrical part, the ESR of the roll-up type capacitor of this embodiment can be lower than the ESR of the conventional roll-up type capacitor. For example, it is assumed herein that the sum of the lengths of the plurality of cylindrical parts arranged in parallel with one another in the roll-up type capacitor including the plurality of cylindrical parts is equivalent to the length of the one cylindrical part in the roll-up type capacitor including only the one cylindrical part, each of which lengths corresponds to the length of the cylindrical part in the direction along the center axis. In this case, the length of the roll-up type capacitor including the plurality of cylindrical parts in a current drawing direction can be shorter than the length of the roll-up type capacitor including only the one cylindrical part in the current drawing direction, while capacitance is maintained equivalent. Accordingly, reduction of ESR and equivalent series inductance (ESL) is achievable without lowering capacitance, in which condition capacitance is obtainable in a higher wavelength range. In other words, assuming that the occupied volume of the cylindrical part(s) included in the roll-up type capacitor is uniform, reduction of ESR and ESL is achievable while maintaining equivalent capacitance when the plurality of cylindrical parts are arranged in parallel with one another, in comparison with the roll-up type capacitor including only the one cylindrical part. When the length of each of the cylindrical parts is uniform, the roll-up type capacitor including the plurality of cylindrical parts in parallel with one another according to this embodiment can obtain higher capacitance than the roll-up type capacitor including only the one cylindrical part.

Assuming that a length in a direction parallel with the rolling direction of the laminate is a length L, and that a length in a direction perpendicular to a laminating direction and the rolling direction of the laminate is a width W, ESR of each cylindrical part varies in accordance with a ratio of the length L to the width W. ESR of each cylindrical part decreases as the length L of the laminate increases. On the other hand, ESR of each cylindrical part increases as the width W of the laminate increases. Accordingly, for producing a roll-up type capacitor having a predetermined ESR value, the number of the cylindrical parts needs to be determined in accordance with the ratio of the length L to the width W of the laminate. After conducting examinations, the present inventors have found that ESR of the roll-up type capacitor decreases when the number of the cylindrical parts is determined in the following manner in accordance with a ratio L/W indicating a ratio of the length L to the width W of the laminate. More specifically, the roll-up type capacitor capable of reducing ESR includes two or more cylindrical parts when the L/W is four or larger, includes three or more cylindrical parts when the L/W is three or larger and smaller than four, includes four or more cylindrical parts when the L/W is two or larger and smaller than three, and includes eight or more cylindrical parts when the L/W is one or larger and smaller than two. The value of ESR varies in accordance with the material or thickness of the electrode or other conditions. Assuming that the upper electrode layer and the lower electrode layer (and a third electrode layer when present) are constituted by Ni layers, and that the dielectric layer is constituted by a $SiO_2$ layer, a low ESR value of 2.5Ω or lower is achievable when the foregoing configuration is adopted.

In the roll-up type capacitor according to this embodiment, the cylindrical parts are produced from the self-rolled rectangular laminate. Assuming that a length in a direction parallel with the rolling direction of the laminate is the length L, and that a length in a direction perpendicular to the laminating direction and the rolling direction of the laminate is the width W, it is considered that ESR of the produced roll-up type capacitor decreases as the length L increases (i.e., the number of turns of the laminate increases). According to examinations conducted by the present inventors, however, it has been found that increase in the length L of the laminate may produce a defect at the time of rolling, and may easily produce deviation in rolling. It is preferable, therefore, that the length L of the laminate is 3 mm or smaller based on the examinations of the present inventors. When the length L is 3 mm or smaller, considerable reduction of defects is achievable, and deviation in rolling is effectively avoidable. It is more preferable that the length L of the laminate is in a range from 0.5 mm to 2.0 mm (inclusive).

It is preferable that a length of the cylindrical part 2 is 750 μm or smaller. When the length of the cylindrical part 2 lies within this range, the capacitor including the two or more cylindrical parts arranged in parallel with one another can exhibit decreased ESR of 2.5 or lower. The length of the cylindrical part 2 corresponds to the width W of the laminate 10.

The roll-up type capacitor illustrated in FIG. 1 includes two cylindrical parts. However, the roll-up type capacitor according to the present invention is not limited to this specific configuration. The roll-up type capacitor may include three or more cylindrical parts. The positions of the cylindrical parts are not particularly limited, and may be selected from arbitrary positions in accordance with purposes of use. For example, the two or more cylindrical parts may be arranged in parallel with one another in the horizontal direction, or may have three-dimensional structure arranged in parallel with one another both in the horizontal direction and the height direction (thickness direction), for example. The distance between the respective cylindrical parts arranged in parallel with one another may be appropriately determined in accordance with purposes of use.

The shape of the roll-up type capacitor 1 according to this embodiment is not particularly limited. For example, the roll-up type capacitor 1 may be a plate-type capacitor. It is preferable that the thickness of the roll-up type capacitor 1 is 100 μm or smaller. When the thickness of the roll-up type capacitor lies in this range, the capacitor becomes appropriate for use in an electronic device required to be compact and short, and further appropriate for a built-in capacitor contained in a substrate. Moreover, the wire length of the capacitor from a load is allowed to decrease, wherefore an advantage of reduction of a loss produced by inductance of the wire is realizable.

The material constituting the lower electrode layer 12 may be an arbitrary material as long as the material has conductivity. For example, the lower electrode layer 12 may be constituted by Ni, Cu, Al, W, Ti, Ag, Au, Pt, Zn, Sn, Pb, Fe, Cr, Mo, Ru, Pd, or Ta, or an alloy of these materials, such as CuNi, AuNi, and AuSn, or metal oxide or metal oxynitride such as TiN, TiAlN, TiON, TiAlON, and TaN.

The thickness of the lower electrode layer 12 is not particularly limited. It is preferable, however, that the thickness of the lower electrode layer 12 lies in a range from 10 nm to 50 nm (inclusive), for example. When the thickness of the lower electrode layer 12 is increased to 50 nm, for example, ESR can be further decreased. When the thickness of the lower electrode layer 12 is decreased to 10 nm, for example, the diameter of the cylindrical part 2 can be further decreased. In this case, further size reduction of the roll-up type capacitor 1 is achievable.

The method for producing the lower electrode layer 12 is not particularly limited. The lower electrode layer 12 may be formed directly on a substrate, or on a lower layer formed on the substrate (such as a sacrificial layer described below) when the lower layer is present thereon. Alternatively, the lower electrode layer 12 produced separately may be affixed to the substrate or the lower layer. The lower electrode layer 12 directly provided on the substrate or the layer below the lower electrode layer may be formed by methods such as vacuum deposition, chemical deposition, sputtering, atomic layer deposition (ALD), and pulsed layer deposition (PLD).

The material constituting the dielectric layer 14 may be an arbitrary material as long as the material has insulation property. Examples of the material constituting the dielectric layer 14 may include: perovskite type complex oxide, aluminum oxide ($AlO_x$: such as $Al_2O_3$), silicon oxide ($SiO_x$: such as $SiO_2$), Al—Ti complex oxide ($AlTiO_x$), Si—Ti complex oxide ($SiTiO_x$), hafnium oxide ($HfO_x$), tantalum oxide ($TaO_x$), zirconium oxide ($ZrO_x$), Hf—Si complex oxide ($HfSiO_x$), Zr—Si complex oxide ($ZrSiO_x$), Ti—Zr complex oxide ($TiZrO_x$), Ti—Zr—W complex oxide ($TiZrWO_x$), titanium oxide ($TiO_x$), Sr—Ti complex oxide ($SrTiO_x$), Pb—Ti complex oxide ($PbTiO_x$), Ba—Ti complex oxide ($BaTiO_x$), Ba—Sr—Ti complex oxide ($BaSrTiO_x$), Ba—Ca—Ti complex oxide ($BaCaTiO_x$), Si—Al complex oxide ($SiAlO_x$), and other metal oxides; aluminum nitride ($AlN_y$), silicon nitride ($SiN_y$), Al—Sc complex nitride ($AlScN_y$), and other metal nitrides; and aluminum oxynitride ($AlO_xN_y$), silicon oxynitride ($SiO_xN_y$), Hf—Si complex oxynitride ($HfSiO_xN_y$), Si—C complex oxynitride ($SiC_zO_xN_y$), and other metal oxynitrides. The respective expressions presented above indicate only constitutions of elements, and do not limit compositions of the elements. More specifically, x, y, and z suffixed to O, N, and C may be arbitrary values. Abundance ratios of the respective elements including metal elements are arbitrary ratios. It is preferable that the material has a higher dielectric constant for obtaining higher capacitance. An example of material having a high dielectric constant is perovskite type complex oxide expressed as $ABO_3$ (A and B: arbitrary metal atoms). A preferable example is perovskite type complex oxide containing titanium (Ti) (hereinafter referred to as "titanium (Ti)-based perovskite type complex oxide" as well). Examples of preferable Ti-based perovskite type complex oxide include $BaTiO_3$, $SrTiO_3$, $CaTiO_3$, $(BaSr)TiO_3$, $(BaCa)TiO_3$, $(SrCa)TiO_3$, $Ba(TiZr)O_3$, $Sr(TiZr)O_3$, $Ca(TiZr)O_3$, $(BaSr)(TiZr)O_3$, $(BaCa)(TiZr)O_3$, and $(SrCa)(TiZr)O_3$. These Ti-based perovskite type complex oxides have high dielectric constants, and thus are advantageous in view of capability of raising capacitance of a capacitor.

The thickness of the dielectric layer 14 is not particularly limited. It is preferable, however, that the thickness of the dielectric layer 14 lies in a range from 10 nm to 100 nm (inclusive), and more preferably in a range from 10 nm to 50 nm (inclusive). When the thickness of the dielectric layer 14 is 10 nm or larger, insulation property can be further improved. In this case, leakage current can be further decreased. When the thickness of the dielectric layer 14 is 100 nm or smaller, capacitance to be obtained can be further increased. When the thickness of the dielectric layer 14 is 100 nm or smaller, the diameter of the cylindrical part 2 can be further decreased. In this case, further size reduction of the roll-up type capacitor 1 is achievable.

The method for producing the dielectric layer 14 is not particularly limited. The dielectric layer 14 may be formed directly on the lower electrode layer 12. Alternatively, the separately produced dielectric layer may be affixed to the lower electrode layer 12. The dielectric layer 14 directly provided on the lower electrode layer 12 may be formed by methods such as vacuum deposition, chemical deposition, sputtering, ALD, and PLD. When the dielectric layer is made of perovskite type complex oxide, the dielectric layer 14 is preferably formed by sputtering.

When the dielectric layer 14 is formed by sputtering, it is preferable that deposition is performed at a substrate temperature in a range from 500° C. to 600° C. (inclusive). When deposition is performed at a high temperature in this range, crystalline of the produced dielectric layer 14 can be increased. Accordingly, a higher dielectric constant is obtainable. In case of processing at such a high temperature, it is preferable that the laminate 10 contains a diffusion-preventing layer 25 which will be described below.

The material constituting the upper electrode layer 16 may be an arbitrary material as long as the material has conductivity. For example, the material constituting the upper electrode layer 16 is Ni, Cu, Al, W, Ti, Ag, Au, Pt, Zn, Sn, Pb, Fe, Cr, Mo, Ru, Pd, or Ta, an alloy of these materials such as CuNi, AuNi, and AuSn, or metal oxide or metal oxynitride such as TiN, TiAlN, TiON, TiAlON, and TaN.

The thickness of the upper electrode layer 16 is not particularly limited. It is preferable, however, that the thickness of the upper electrode layer 16 lies in a range from 10 nm to 50 nm (inclusive), for example, and more preferably in a range from 10 nm to 30 nm (inclusive). When the thickness of the upper electrode layer 16 is increased to 50 nm, for example, ESR can be further decreased. When the thickness of the upper electrode layer 16 is decreased to 30 nm or smaller, for example, the diameter of the cylindrical part 2 can be further decreased. In this case, further size reduction of the roll-up type capacitor 1 is achievable.

The method for producing the upper electrode layer 16 is not particularly limited. The upper electrode layer 16 may be formed directly on the dielectric layer 14. Alternatively, separately produced the upper electrode layer 16 may be affixed to the dielectric layer 14. The upper electrode layer 16 directly provided on the dielectric layer may be formed by methods such as vacuum deposition, chemical deposition, sputtering, ALD, and PLD.

As illustrated in FIG. 2, the insulating layer 18 may be provided on the upper electrode layer 16 and the dielectric layer 14 to prevent short-circuiting caused by electric contact between the lower electrode layer 12 and the upper electrode layer 16 when the laminate 10 is rolled up. The material constituting the insulating layer 18 may be an arbitrary material as long as the material has insulation property. It is preferable, however, that the insulating layer 18 is made of any one of the foregoing examples of the material of the dielectric layer 14. When the insulating layer 18 is made of any one of the examples of the material constituting the dielectric layer 14, the function of the insulating layer 18 as a dielectric layer improves. Accordingly, the capacitor exhibiting further increased capacitance can be obtained.

The thickness of the insulating layer 18 is not particularly limited as long as insulation between the lower electrode layer 12 and the upper electrode layer 16 is securable. It is preferable, however, that the thickness of the insulating layer 18 lies in a range from 10 nm to 100 nm (inclusive), for example, and more preferably in a range from 10 nm to 50 nm (inclusive). When the thickness of the insulating layer 18 is 10 nm or larger, insulation property increases. In this case, leakage current further decreases. When the thickness of the insulating layer 18 is 100 nm or smaller, the diameter of the cylindrical part 2 further decreases. In this case, further size reduction of the capacitor is achievable.

The method for producing the insulating layer 18 is not particularly limited. The insulating layer 18 may be formed directly on the upper electrode layer 16 and the dielectric layer 14. Alternatively, the separately produced insulating layer 18 may be affixed to the upper electrode layer 16 and the dielectric layer 14. The insulating layer 18 directly provided on the upper electrode layer 16 and the dielectric layer 14 may be formed by methods such as vacuum deposition, chemical deposition, sputtering, ALD, and PLD. When the insulating layer is made of perovskite type complex oxide, the insulating layer is preferably formed by sputtering.

It is preferable that a part indicated by a reference number 24 in FIG. 2 is filled with an insulating substance such as a resin. The presence of the insulating substance in the part 24 further secures electric insulation between the upper electrode layer 16 and the second external electrode 6 and between the lower electrode layer 12 and the first external electrode 4. Examples of the method for forming the resin in the part 24 include impregnation of a resin into the cylindrical part after completion of rolling of the cylindrical part. This method is also adoptable for forming a resin in the part 24 in modified examples referred to below.

The first external electrode 4 is disposed at one side end of the two or more cylindrical parts, and electrically connected to the upper electrode layers of the two or more cylindrical parts. The second external electrode is disposed at the other side end of the two or more cylindrical parts, and electrically connected to the lower electrode layers of the two or more cylindrical parts. This arrangement of the first external electrode 4 and the second external electrode 6 allows parallel connection between the two or more cylindrical parts, thereby decreasing the ESR and ESL of the roll-up type capacitor 1. Each of the materials constituting the first external electrode 4 and the second external electrode 6 may be an arbitrary material as long as the material has conductivity. Examples of the material constituting the first external electrode 4 and the second external electrode 6 include Ag, Cu, Pt, Ni, Al, Pd, and Au, and alloys of these materials such as monel (Ni—Cu alloy).

The method for producing the first external electrode 4 and the second external electrode 6 is not particularly limited. Examples of this method include plating, deposition, and sputtering.

According to the roll-up type capacitor 1 of this embodiment, the cylindrical part 2 may be surrounded by and embedded in the resin part 8 as illustrated in FIG. 1. In this case, the area of the cylindrical part 2 other than both ends thereof is covered by the resin part 8. The resin part 8 is provided to protect the cylindrical part 2, and to allow easy handling of the cylindrical part 2. Resin forming the resin part 8 may permeate into the cylindrical part 2. The cylindrical part 2 into which resin is impregnated is hardened with the resin, in which condition the properties of the capacitor are further stabilized. The resin part 8 is not an essential component. The roll-up type capacitor 1 according to this embodiment functions even when the resin part 8 is absent.

The material constituting the resin part 8 may be an arbitrary material as long as the material has insulation property. The resin part 8 may be made of acrylic resin, epoxy, polyester, silicone, polyurethane, polyethylene, polypropylene, polystyrene, nylon, polycarbonate, polybutylene terephthalate or the like. The resin part 8 may contain insulating substances as fillers to increase strength.

Figure 3:
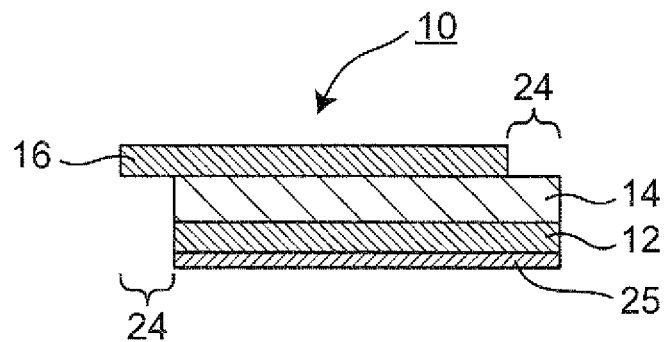
FIG. 3 is a schematic cross-sectional view of a first variant of the laminate constituting the cylindrical part of the roll-up type capacitor perpendicular to the direction of the rolling-up.
Figure 6:
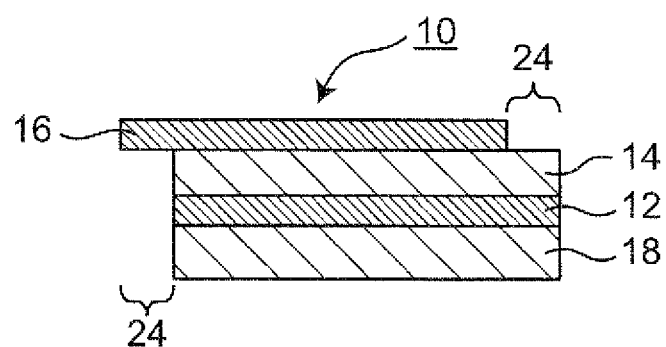
FIG. 6 is a schematic cross-sectional view of a fourth variant of the laminate constituting the cylindrical part of the roll-up type capacitor perpendicular to the direction of the rolling-up.

FIG. 3 illustrates a first modified example of the laminate 10 according to this embodiment. As illustrated in FIG. 3, a diffusion-preventing layer 25 may be further provided below the lower electrode layer 12. The diffusion-preventing layer 25 prevents diffusion of components constituting the sacrificial layer (described below) toward the lower electrode layer 12 at the time of manufacture of the roll-up type capacitor. When the insulating layer 18 is further laminated below the lower electrode layer 12 as illustrated in FIG. 6 referred to below, the diffusion-preventing layer 25 may be laminated below the insulating layer 18.

The material constituting the diffusion-preventing layer 25 is not particularly limited. Preferable examples of the material constituting the diffusion-preventing layer 25 may include: aluminum oxide ($AlO_x$: such as $Al_2O_3$), silicon oxide ($SiO_x$: such as $SiO_2$), Al—Ti complex oxide ($AlTiO_x$), Si—Ti complex oxide ($SiTiO_x$), hafnium oxide ($HfO_x$), tantalum oxide ($TaO_x$), zirconium oxide ($ZrO_x$), Hf—Si complex oxide ($HfSiO_x$), Zr—Si complex oxide ($ZrSiO_x$), Ti—Zr complex oxide ($TiZrO_x$), Ti—Zr—W complex oxide ($TiZrWO_x$), titanium oxide ($TiO_x$), Sr—Ti complex oxide ($SrTiO_x$), Pb—Ti complex oxide ($PbTiO_x$), Ba—Ti complex oxide ($BaTiO_x$), Ba—Sr—Ti complex oxide ($BaSrTiO_x$), Ba—Ca—Ti complex oxide ($BaCaTiO_x$), Si—Al complex oxide ($SiAlO_x$), Sr—Ru complex oxide ($SrRuO_x$), Sr—V complex oxide ($SrVO_x$), and other metal oxides; aluminum nitride ($AlN_y$), silicon nitride ($SiN_y$), Al—Sc complex nitride ($AlScN_y$), titanium nitride ($TiN_y$), and other metal nitrides; and aluminum oxynitride ($AlO_xN_y$), silicon oxynitride ($SiO_xN_y$), Hf—Si complex oxynitride ($HfSiO_xN_y$), Si—C complex oxynitride ($SiC_zO_xN_y$), and other metal oxynitrides, and particularly preferably $AlO_x$ and $SiO_x$. The respective expressions presented above indicate only constitutions of elements, and do not limit compositions of the elements. More specifically, x, y, and z suffixed to O, N, and C may be arbitrary values. Abundance ratios of the respective elements including metal elements are arbitrary ratios.

The thickness of the diffusion-preventing layer 25 is not particularly limited. It is preferable, however, that the thickness of the diffusion-preventing layer 25 lies in a range from 5 nm to 30 nm (inclusive), for example, and more preferably in a range from 5 nm to 10 nm (inclusive). When the thickness of the diffusion-preventing layer 25 is 5 nm or larger, diffusion of components constituting the sacrificial layer can decrease more effectively. When the diffusion-preventing layer 25 is made of insulating material, insulation property improves. Accordingly, leakage current decreases. When the thickness of the diffusion-preventing layer 25 is 30 nm or smaller, particularly 10 nm or smaller, the diameter of the cylindrical part 2 further decreases. In this case, further size reduction of the roll-up type capacitor 1 is achievable. Moreover, the roll-up type capacitor exhibiting further increased capacitance can be obtained.

The diffusion-preventing layer 25 may be formed by vacuum deposition, chemical deposition, sputtering, ALD, PLD, or other methods. In these methods, ALD is more preferable. The method of ALD forms a film by depositing atomic layers one by one by using reaction gas which contains material constituting the layers. Accordingly, ALD produces an extremely uniform and fine film. The diffusion-preventing layer 25 formed on the sacrificial layer by ALD is capable of effectively reducing diffusion of the components constituting the sacrificial layer toward other layers, such as the lower electrode layer 12. Moreover, the extremely thin, uniform, and fine diffusion-preventing layer 25 formed by ALD can be a film capable of decreasing leakage current and offering high insulation property when the diffusion-preventing layer 25 is made of insulating material. A film formed by ALD is generally amorphous. Accordingly, the composition ratio of the film is not limited to a stoichiometric ratio, but may be other various composition ratios.

When the diffusion-preventing layer 25 is made of insulating material, electric contact between the upper electrode layer 16 and the lower electrode layer 12 is avoidable in the cylindrical part 2 produced from the rolled-up laminate 10 by the presence of the diffusion-preventing layer 25. In this case, the insulating layer 18 discussed above is unnecessary.

It is preferable that the part indicated by the reference number 24 in the modified example illustrated in FIG. 3 is filled with an insulating substance such as a resin. The presence of the insulating substance in the part 24 can further secure electric insulation between the upper electrode layer 16 and the second external electrode 6 and between the lower electrode layer 12 and the first external electrode 4.

Figure 4:
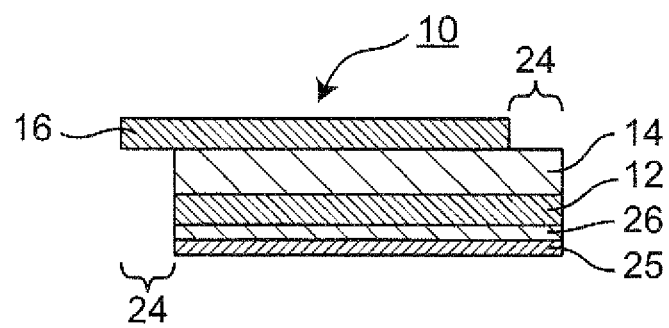
FIG. 4 is a schematic cross-sectional view of a second variant of the laminate constituting the cylindrical part of the roll-up type capacitor perpendicular to the direction of the rolling-up.

FIG. 4 illustrates a second modified example of the laminate 10 according to this embodiment. As illustrated in FIG. 4, an adhering layer 26 may be further laminated between the diffusion-preventing layer 25 and the lower electrode layer 12. The adhering layer 26 has a function of adhering to the diffusion-preventing layer 25 and the lower electrode layer 12 to prevent separation of the lower electrode layer 12 from the laminate 10. When the insulating layer 18 is further laminated below the lower electrode layer 12 as illustrated in FIG. 6 referred to below, the adhering layer 26 may be laminated between the insulating layer 18 and the diffusion-preventing layer 25.

The material constituting the adhering layer 26 may be titanium oxide ($TiO_x$) or chromium oxide ($CrO_x$), for example.

The method for producing the adhering layer 26 is not particularly limited. For example, the adhering layer 26 may be formed directly on a layer present below the adhering layer 26 (such as sacrificial layer). Alternatively, the adhering layer 26 separately produced may be affixed to the layer present below the adhering layer 26. The adhering layer 26 provided directly on the layer present below the adhering layer 26 may be formed by vacuum deposition, chemical deposition, sputtering, ALD, PLD, or other methods.

It is preferable that the part indicated by the reference number 24 in the modified example illustrated in FIG. 4 is filled with an insulating substance such as a resin. The presence of the insulating substance in the part 24 can further secure electric insulation between the upper electrode layer 16 and the second external electrode 6 and between the lower electrode layer 12 and the first external electrode 4.

Figure 5:
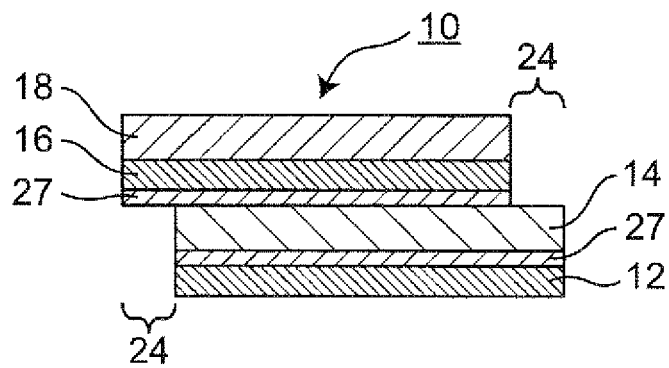
FIG. 5 is a schematic cross-sectional view of a third variant of the laminate constituting the cylindrical part of the roll-up type capacitor perpendicular to the direction of the rolling-up.
Figure 7:
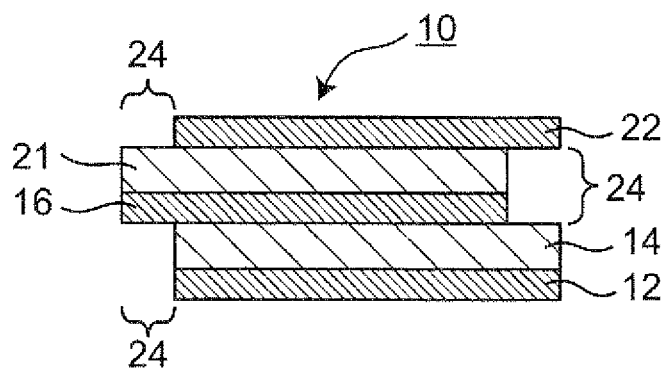
FIG. 7 is a schematic cross-sectional view of a fifth variant of the laminate constituting the cylindrical part of the roll-up type capacitor perpendicular to the direction of the rolling-up.
Figure 8A:
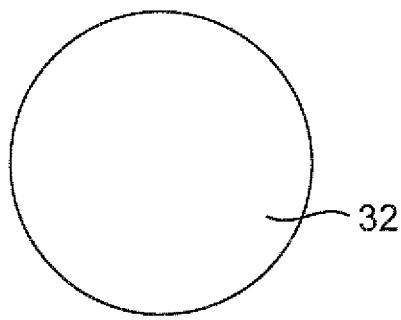
FIGS. 8(a) to 8(f) schematically show a process for producing a roll-up type capacitor of Example 5.
Figure 8B:
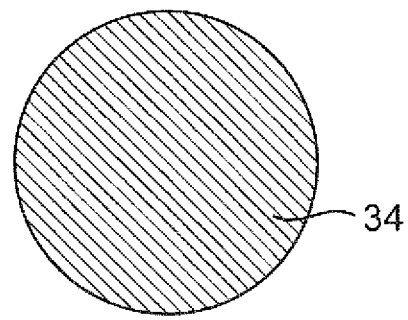
Figure 8C:
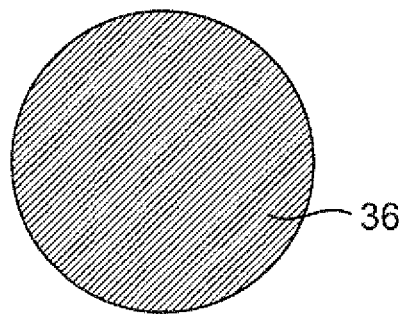
Figure 8D:
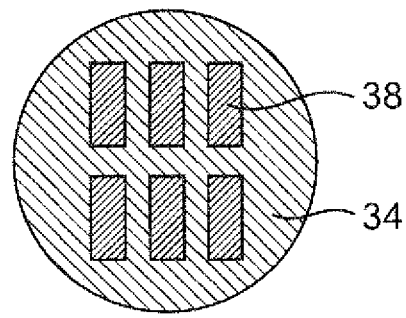
Figure 8E:
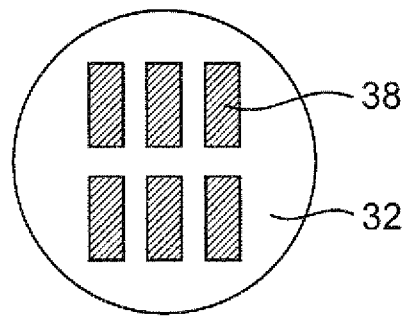
Figure 8F:
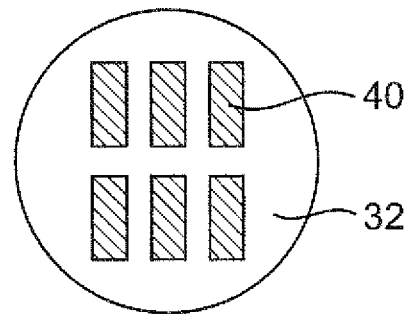

FIG. 5 illustrates a third modified example of the laminate 10 according to this embodiment. As illustrated in FIG. 5, an interfacial layer 27 may be further laminated between the dielectric layer 14 and the upper electrode layer 16, and/or between the dielectric layer 14 and the lower electrode layer 12. The interfacial layer 27 has a function of reducing leakage current produced by Schottky junction. When the insulating layer 18 is further laminated below the lower electrode layer 12 as illustrated in FIG. 6 referred to below, the interfacial layer 27 may be further laminated between the insulating layer 18 and the lower electrode layer 12. When a second dielectric layer 21 and a third electrode layer 22 are further laminated in this order on the upper electrode layer 16 as illustrated in FIG. 7 referred to below, the interfacial layer 27 may be further laminated between the second dielectric layer 21 and the upper electrode layer 16, and/or between the second dielectric layer 21 and the third electrode layer 22.

According to the laminate 10 illustrated in FIG. 5, the insulating layer 18 is laminated on the upper electrode layer 16. However, the insulating layer 18 is not an essential constituent element in this embodiment, and not required to be equipped when there is no possibility of electric contact between the lower electrode layer 12 and the upper electrode layer 16.

The material constituting the interfacial layer 27 may be arbitrary metal appropriate for the material of the dielectric layer.

The method for producing the interfacial layer 27 is not particularly limited. For example, the interfacial layer 27 may be formed directly on a layer present below the interfacial layer 27. Alternatively, the interfacial layer 27 separately produced may be affixed to the layer present below the interfacial layer 27. The interfacial layer 27 provided directly on the layer present below the interfacial layer 27 may be formed by vacuum deposition, chemical deposition, sputtering, ALD, PLD, or other methods.

It is preferable that the part indicated by the reference number 24 in the modified example illustrated in FIG. 5 is filled with an insulating substance such as a resin. The presence of the insulating substance in the part 24 can further secure electric insulation between the upper electrode layer 16 and the second external electrode 6 and between the lower electrode layer 12 and the first external electrode 4.

FIG. 6 illustrates a fourth modified example of the laminate 10 according to this embodiment. As illustrated in FIG. 6, the insulating layer 18 may be further laminated below the lower electrode layer 12. When the insulating layer 18 is laminated in this manner, electric contact between the upper electrode layer 16 and the lower electrode layer 12 is avoidable by the presence of the insulating layer 18 in the cylindrical part 2 constituted by the rolled laminate 10. In this case, an insulating layer need not be provided on the upper electrode layer 16.

The material constituting the insulating layer 18 may be any one of the foregoing examples of the material of the dielectric layer 14. The method for producing the insulating layer 18 may be any one of the foregoing examples of the method for producing the dielectric layer 14.

It is preferable that the part indicated by the reference number 24 in the modified example illustrated in FIG. 6 is filled with an insulating substance such as a resin. The presence of the insulating substance in the part 24 can further secure electric insulation between the upper electrode layer 16 and the second external electrode 6 and between the lower electrode layer 12 and the first external electrode 4.

FIG. 7 illustrates a fifth modified example of the laminate 10 according to this embodiment. As illustrated in FIG. 7, another dielectric layer (referred to as second dielectric layer 21), and another electrode layer (referred to as third electrode layer 22) are further laminated in this order on the upper electrode layer 16. The laminate illustrated in FIG. 7 contains the three electrode layers 12, 16, and 22, and the dielectric layers 14 and 21 provided between the electrode layers 12 and 16, and between the electrode layers 16 and 22, respectively. However, the present invention is not limited to this specific configuration. The laminate may contain four or more electrode layers and dielectric layers provided therebetween. The third electrode layer 22 is disposed in such a position not completely overlapping with the upper electrode layer 16 similarly to the lower electrode layer 12. In this case, the third electrode layer 22 is electrically connected to the second external electrode 6, and electrically separated from the first external electrode 4. When the second dielectric layer 21 and the third electrode layer 22 are laminated in this condition, electric contact between the upper electrode layer 16 and the lower electrode layer 12 is avoidable in the cylindrical part 2 produced from the rolled-up laminate 10. Accordingly, the insulating layer 18 discussed above is unnecessary.

The material constituting the second dielectric layer 21 may be any one of the foregoing examples of the material constituting the dielectric layer 14. The method for producing the second dielectric layer 21 may be any one of the foregoing examples of the method for producing the dielectric layer 14.

The material constituting the third electrode layer 22 may be any one of the foregoing examples of the material constituting the lower electrode layer 12. The method for producing the third electrode layer 22 may be any one of the foregoing examples of the method for producing the lower electrode layer 12.

It is preferable that the part indicated by the reference number 24 in the modified example illustrated in FIG. 7 is filled with an insulating substance such as a resin. The presence of the insulating substance in the part 24 can further secure electric insulation between the third electrode layer 22 and the first external electrode 4, between the upper electrode layer 16 and the second external electrode 6, and between the lower electrode layer 12 and the first external electrode 4.

The roll-up type capacitor according to the present invention is not limited to the capacitor described in the embodiment herein, but may be modified in various ways as long as the function as the capacitor is offered. For example, a plurality of identical layers, or additional layers may be formed.

A process for producing a roll-up type capacitor according to an embodiment of the present invention is hereinafter described. The process for producing the roll-up type capacitor according to the present invention is not limited to the process described herein.

A roll-up type capacitor according to this embodiment is generally produced by forming a sacrificial layer on a substrate; forming a plurality of laminates each including at least a lower electrode layer, an upper electrode layer, and a dielectric layer between the lower electrode layer and the upper electrode layer on the sacrificial layer; rolling up the laminate by removal of the sacrificial layer to obtain a plurality of cylindrical part; arranging the plurality of cylindrical parts in parallel with one another; forming a first external electrode on first side ends of the two or more cylindrical parts such that the first external electrode is electrically connected to the upper electrode layers of the two or more cylindrical parts; and forming a second external electrode on second side ends of the two or more cylindrical parts such that the second external electrode is electrically connected to the lower electrode layers of the two or more cylindrical parts. More specifically, the roll-up type capacitor according to this embodiment is manufactured by the process described below.

Initially, a substrate is prepared.

The material constituting the substrate is not particularly limited. It is preferable, however, that the substrate is made of such a material not adversely affecting deposition of a sacrificial layer, and stable for etchant used for removal of the sacrificial layer. Examples of the material constituting the substrate include silicone, silica, and magnesia.

Then, a sacrificial layer is formed on the substrate.

The material constituting the sacrificial layer may be an arbitrary material as long as the material is removable by etching or other methods after formation of a laminate described below. The sacrificial layer is preferably made of germanium, or germanium oxide, since both are relatively stable at a high temperature.

The thickness of the sacrificial layer is not particularly limited. For example, the thickness of the sacrificial layer lies in a range from 5 nm to 100 nm (inclusive), and more preferably in a range from 10 nm to 30 nm (inclusive).

The method for forming the sacrificial layer is not particularly limited. The sacrificial layer may be formed directly on the substrate. Alternatively, a film separately produced may be affixed to the substrate. The sacrificial layer provided directly on the substrate may be formed by vacuum deposition, chemical deposition, sputtering, PLD or other methods.

Instead, the sacrificial layer may be formed by processing a precursor layer formed on the substrate. For example, a metal layer may be formed and oxidized on the substrate to produce the sacrificial layer.

Subsequently, a laminate which contains at least a lower electrode layer, an upper electrode layer, and a dielectric layer sandwiched between the lower electrode layer and the upper electrode layer is formed on the sacrificial layer. The step for forming the laminate may include forming the lower electrode layer, the dielectric layer, and the upper electrode layer in this order by the method described above. The number of the laminate is not limited to one for the one substrate at the same time. A plurality of the laminates may be formed on the one substrate. When the roll-up type capacitor includes other layers such as an insulating layer, a diffusion-preventing layer, an adhering layer, a second dielectric layer, and a third electrode layer, these layers may be formed at desired positions to manufacture the laminate.

More specifically, the process for producing the roll-up type capacitor according to this embodiment may include a step for forming an insulating layer on the upper electrode layer, for example. The process may include a step for forming a diffusion-preventing layer before forming the lower electrode layer. When the step for forming the diffusion-preventing layer is present, the process may include a step for forming an adhering layer between the diffusion-preventing layer and the lower electrode layer. The process may further include a step for forming an interfacial layer between the dielectric layer and the upper electrode layer, and/or between the dielectric layer and the lower electrode layer.

The process may include a step for forming an insulating layer before forming the lower electrode layer. The process may further include a step for forming another dielectric layer (second dielectric layer) and another electrode layer (third electrode layer) on the upper electrode layer.

According to the foregoing laminate, the lower electrode layer and the upper electrode layer are disposed such that one end of each of the lower electrode layer and the upper electrode layer does not overlap with the other electrode layer as illustrated in FIG. 2, for example. The laminate having this structure may be manufactured by using a metal mask (metallic mask), for example, or by using a photolithography technique.

The entire laminate discussed above has an internal stress directed from the lower electrode layer to the upper electrode layer. This internal stress is generated by applying a tensile stress to a layer in the lower region of the laminate, such as the lower electrode layer, and/or applying a compressive stress to a layer in the upper region of the laminate, such as the upper electrode layer. It is preferable that the laminate is formed such that the lower electrode layer has a tensile stress, and that the upper electrode layer has a compressive stress. The material and the forming method of the layer receiving a tensile stress or a compressive stress may be appropriately selected by those skilled in the art.

The laminate is separated from the substrate by the internal stress generated in the laminate in the direction from the lower electrode layer to the upper electrode layer. Then, the laminate can be bent and self-rolled by the internal stress.

The laminate obtained in the foregoing manner is rolled up by removal of the sacrificial layer.

The method for removing the sacrificial layer is not particularly limited. It is preferable, however, that the sacrificial layer is etched using etchant. For example, the sacrificial layer or the substrate is exposed by etching or other methods at the starting portion of the rolling of the laminate. Etchant is poured through the exposed portion, and then the sacrificial layer can be etched to be removed.

The etchant may be appropriately selected in accordance with the material constituting the sacrificial layer and the layers forming the laminate. When the sacrificial layer is made of Ge or $GeO_2$, for example, hydrogen peroxide solution is preferably used as etchant.

The sacrificial layer is gradually removed from one end of the laminate. The laminate is sequentially separated from the substrate such that the separation of the laminate starts from the removed portion of the sacrificial layer. The separated laminate is bended and rolled by the internal stress of the laminate, and thus formed into a cylindrical part. The number of windings of the cylindrical part is not particularly limited, i.e., may be either one or plural. The number of windings of the cylindrical part is appropriately determined in accordance with desired size (diameter) and capacitance of the roll-up type capacitor to be produced.

Subsequently, the two or more cylindrical parts are arranged in parallel with one another. The number and positions of the cylindrical parts may be arbitrary number and positions as long as the cylindrical parts are arranged in parallel with one another. The number and positions of the cylindrical parts may be appropriately determined in accordance with purposes of use and desired characteristics and sizes.

Then, a first external electrode and a second external electrode are formed at one side ends and the other side ends, respectively, of the two or more cylindrical parts arranged in parallel with one another. The first external electrode is electrically connected to the upper electrode layer of each of the two or more cylindrical parts, while the second external electrode is electrically connected to the lower electrode layer of each of the two or more cylindrical parts. The first external electrode and the second external electrode may be formed by the methods described above, such as plating. The first external electrode and the second external electrode thus formed realize parallel connection between the two or more cylindrical parts.

It is preferable that the process for producing the roll-up type capacitor according to this embodiment further includes a step for hardening, with a resin, the two or more cylindrical parts arranged in parallel with one another before forming the first external electrode and the second external electrode. More specifically, two or more cylindrical parts each of which has been produced from a rolled laminate are separated from the substrate by using a peeling tape or the like, and arranged in parallel with one another, for example. Then, a dam is formed around the cylindrical parts arranged in parallel with one another. The cylindrical parts formed on the substrate are immersed in a resin poured into the dam. It is preferable that immersion is carried out for a time sufficient for impregnation of the resin into the cylindrical parts.

After the resin is hardened, each of the cylindrical parts is cut into a desired shape such as a rectangular parallelepiped shape. The upper electrode layer and the lower electrode layer are exposed on the surfaces of each of the cylindrical parts at both ends thereof by polishing or other methods. Subsequently, the first external electrode and the second external electrode are formed on the surfaces on which the upper electrode layer and the lower electrode layer are exposed, respectively, to produce a roll-up type capacitor including the two or more cylindrical parts each of which is surrounded by and embedded in the resin part.

The roll-up type capacitor according to this embodiment is now completed.

EXAMPLES

Example 1

A roll-up type capacitor according to Example 1 was produced by the following procedures.

(Formation of Sacrificial Layer Pattern)

Initially, a Si monocrystal substrate having a diameter of four inches (10.16 cm) was prepared as a substrate 32 (FIG. 8(*a*)). A Ge layer having a thickness of 50 nm was formed as a sacrificial layer 34 on the entire surface of the substrate 32 by sputtering (FIG. 8(*b*)). A positive-type photoresist 36 was applied to the entire surface of the sacrificial layer 34 (FIG. 8(*c*)). Then, a strip-shaped hardened photoresist pattern 38 was produced on the sacrificial layer 34 by removing a non-hardened portion after ultraviolet exposure via a mask having a predetermined pattern and development (FIG. 8(d)). The substrate 32 thus formed was immersed in etchant containing hydrogen peroxide solution to remove the sacrificial layer 34 in a part other than a part of the hardened photoresist (FIG. 8(e)). Subsequently, the hardened photoresist pattern 38 was removed by using acetone to produce a strip-shaped sacrificial layer pattern 40 (FIG. 8(f)).

(Formation of Laminate)

Figure 9:
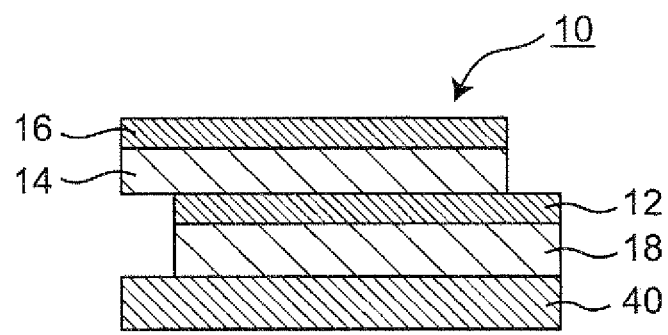
FIG. 9 is a schematic cross-sectional view of a laminate in Example 5 formed on a sacrificial layer perpendicular to the direction of the rolling-up.

A metal mask containing arrangement of strip-shaped patterns each of which has a width of 500 µm and a length of 1.0 mm was placed on the substrate 32 on which the sacrificial layer pattern 40 was formed. A $SiO_2$ layer corresponding to the insulating layer was formed on the sacrificial layer pattern 40 by sputtering, and a Ni layer corresponding to the lower electrode layer 12 was formed on the insulating layer by deposition. Then, the metal mask was shifted by 50 µm in a direction perpendicular to the longer side of the strip-shaped pattern (i.e., width direction). In this condition, a $SiO_2$ layer corresponding to the dielectric layer 14 was formed by sputtering, and a Ni layer corresponding to the upper electrode layer 16 was formed on the dielectric layer 14 by deposition. The thickness of each of the $SiO_2$ layers was 50 nm, while the thickness of each of the Ni layers was 25 nm. Each of the lower electrode layer 12 and the upper electrode layer 16 contained an area of 50 µm in length in the width direction as an area not overlapping with each other in the plan view. As a result, the rectangular laminate 10 having a cross-sectional shape illustrated in FIG. 9 was formed on the sacrificial layer pattern 40. A length L of the laminate 10 was 1.0 mm, while a width W thereof was 500 µm. The cross-sectional view in FIG. 9 is a cross-sectional view taken perpendicularly to the rolling direction of the laminate (i.e., cross-sectional view taken perpendicularly to the length direction of the laminate).

(Formation of Cylindrical Part)

Figure 10A:
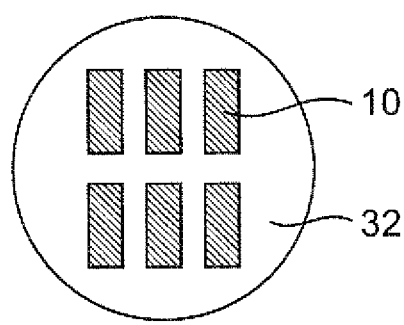
FIGS. 10(a) to 10(d) schematically show a process for producing the roll-up type capacitor of Example 5.
Figure 10B:
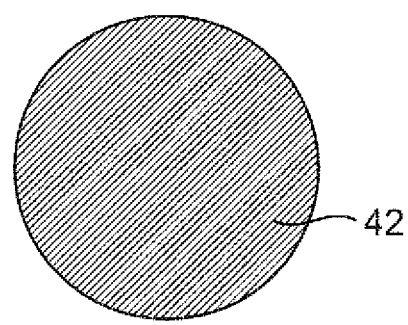
Figure 10C:
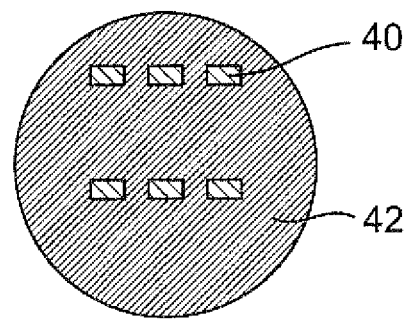
Figure 10D:
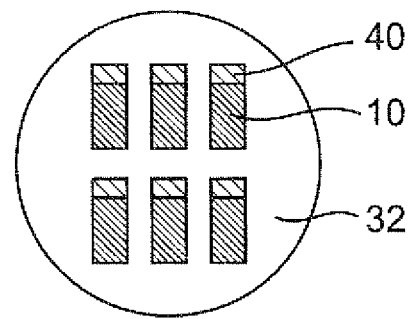

A photoresist 42 was applied (FIG. 10(b)) to the entire surface of the substrate 32 containing arrangement of a plurality of the laminates 10 thus obtained (FIG. 10(a)). The photoresist 42 on one short side of each of the laminates 10 was removed by patterning. Then, the photoresist removal portion was etched by using hydrofluoric acid solution to remove a part of each of the laminates 10 and to expose the sacrificial layer 40 (FIG. 10(c)). Then, the photoresist 42 was removed (FIG. 10(d)). Hydrogen peroxide solution was supplied to the part through which the sacrificial layer 40 was exposed to gradually etch the sacrificial layer 40 from one short side of each of the laminates 10. Each of the laminates 10 was rolled up in accordance with etching of the sacrificial layer 40. The plurality of the cylindrical parts 2 (capacitor bodies) each having a diameter of 50 µm and a length of 500 µm were produced on the substrate 32 by these procedures.

(Formation of Resin Part (Resin Hardening Step))

A dam was formed on an outer edge portion of the substrate 32 where the cylindrical parts 2 were produced in the manner described above. A resin was poured into the dam, and the cylindrical parts were immersed into the resin. Then, air contained in the resin was removed by vacuum heating, whereafter the resin was sufficiently impregnated into the cylindrical parts. After impregnation, the substrate was stored in an oven heated to 150° C. for a whole day and night to thermally harden the resin. The substrate 23 where the cylindrical parts 2 and the hardened resin were formed was rapidly cooled approximately to room temperature to separate the resin from the substrate 32 by utilizing a stress difference between the substrate 32 and the resin. The separated resin contained cylindrical capacitors. Then, a resin was applied to the resin at the separated portion, and thermally hardened in a similar manner to seal the cylindrical parts 2 within the resin.

(Formation of External Electrode)

Figure 11:
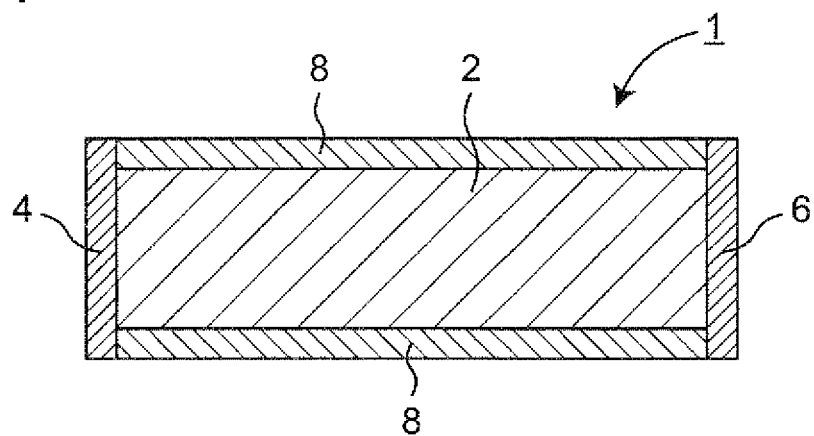
FIG. 11 is a schematic cross-sectional view of a roll-up type capacitor of Example 1 along a central axis of a cylindrical part therein.

The resin surrounding the cylindrical parts 2 produced by the foregoing procedures was cut by a dicer into units each containing the one cylindrical part 2. Then, resin parts provided at both ends of each of the cylindrical parts 2 were polished to expose the lower electrode layer on one of the end surfaces, and the upper electrode layer on the other end surface. The first external electrode 4 and the second external electrode 6 were formed by electroplating on the corresponding end surfaces (exposure surfaces). The upper electrode layer 16 was connected to the first external electrode 4, while the lower electrode layer 12 was connected to the second external electrode 6. The roll-up type capacitor 1 according to Example 1 thus obtained included the one cylindrical part 2 and the resin part 8 surrounding the cylindrical part 2, and had a cross-sectional shape illustrated in FIG. 11.

Examples 2 and 20

Roll-up type capacitors of Example 2 and Example 20 were produced by procedures similar to the procedures of Example 1 except that the length L and the width W of the laminate 10 were set to values as indicated in Table 1 shown below.

Examples 3-19 and 21-25

(Formation of Laminate and Formation of Cylindrical Part)

The plurality of cylindrical parts 2 were formed on the substrate 32 by procedures similar to the procedures of Example 1 except that the length L and the width W of the laminate 10 were set to values as indicated in Table 1.

(Formation of Resin Part (Resin Hardening Step))

The cylindrical parts 2 thus formed were separated from the substrate 32 by using a peeling tape or the like, and arranged in parallel with one another on the peeling tape. The number of the cylindrical parts arranged in parallel with one another is indicated in Table 1 shown below. A dam surrounding the plurality of cylindrical parts 2 was formed on the peeling tape. A resin was poured into the dam, and the cylindrical parts 2 were immersed into the resin. Then, air contained in the resin was removed by vacuum heating, whereafter the resin was sufficiently impregnated into the cylindrical parts 2. After impregnation, the substrate was stored in an oven heated to 150° C. for a whole day and night to thermally harden the resin. The peeling tape was separated from the hardened resin. Then, a resin was applied to a portion of the resin from which the peeling tape was separated, and thermally hardened in a similar manner to seal the cylindrical parts 2 within the resin.

(Formation of External Electrode)

The resin surrounding the plurality of cylindrical parts 2 produced by the foregoing procedures was cut by a dicer along the end surfaces of the cylindrical parts 2. Then, resin parts provided at both ends of each of the cylindrical parts 2 were polished to expose the lower electrode layer on one of the end surfaces, and the upper electrode layer on the other end surface. The first external electrode 4 and the second external electrode 6 were formed by electroplating on the corresponding end surfaces (exposure surfaces). The upper electrode layers 16 were connected to the first external electrode 4, while the lower electrode layers 12 were connected to the second external electrode 6. Each of the roll-up type capacitors 1 of Examples 3 through 19 and Examples 21 through 25 produced in the foregoing manners contains the plurality of cylindrical parts 2 arranged in parallel with one another, and the resin parts 8 surrounding the respective cylindrical parts 2.

(Measurement of ESR)

The ESR of each of the cylindrical capacitors thus obtained was measured under conditions of a temperature 25±2° C., a voltage of 1 Vrms, and a measurement frequency of 10 MHz by using an impedance analyzer (manufactured by Agilent Technologies Ltd., E4990A). Ten samples were measured for each example. Table 1 shows an average of the ten samples for each example.

TABLE 1

| Example | L (mm) | W (mm) | L/W | Number of Cylindrical Parts | Resistance (Ω) |
|---|---|---|---|---|---|
| *1 | 1.0 | 0.50 | 2.0 | 1 | 10 |
| *2 | 0.5 | 0.50 | 1.0 | 1 | 20 |
| *3 | 1.0 | 0.50 | 2.0 | 2 | 5.0 |
| *4 | 0.8 | 0.50 | 1.5 | 2 | 6.7 |
| 5 | 1.0 | 0.25 | 4.0 | 2 | 2.5 |
| *6 | 0.5 | 0.25 | 2.0 | 2 | 5.0 |
| 7 | 0.5 | 0.13 | 4.0 | 2 | 2.5 |
| 8 | 0.5 | 0.10 | 5.0 | 2 | 2.0 |
| *9 | 1.0 | 0.50 | 2.0 | 3 | 3.3 |
| 10 | 1.0 | 0.25 | 4.0 | 3 | 1.7 |
| 11 | 1.0 | 0.50 | 2.0 | 4 | 2.5 |
| 12 | 1.0 | 0.25 | 4.0 | 4 | 1.3 |
| *13 | 1.0 | 1.00 | 1.0 | 4 | 5.0 |
| *14 | 3.0 | 1.50 | 2.0 | 2 | 5.0 |
| *15 | 3.0 | 1.50 | 2.0 | 3 | 3.3 |
| 16 | 3.0 | 1.50 | 2.0 | 4 | 2.5 |
| *17 | 3.0 | 1.00 | 3.0 | 2 | 3.3 |
| 18 | 3.0 | 1.00 | 3.0 | 3 | 2.2 |
| 19 | 3.0 | 1.00 | 3.0 | 4 | 1.7 |
| *20 | 3.0 | 0.75 | 4.0 | 1 | 5.0 |
| 21 | 3.0 | 0.75 | 4.0 | 2 | 2.5 |
| 22 | 3.0 | 0.75 | 4.0 | 3 | 1.7 |
| *23 | 3.0 | 3.00 | 1.0 | 4 | 5.0 |
| *24 | 3.0 | 3.00 | 1.0 | 6 | 3.3 |
| 25 | 3.0 | 3.00 | 1.0 | 8 | 2.5 |

Examples to which mark "*" is given are examples not included in the scope of the present invention.

As can be understood from the results shown in Table 1 in the case of having the same ratio L/W, the resistance of the roll-up type capacitor is decreased as the number of the cylindrical parts arranged in parallel with one another increases. As indicated in Table 1, each of the roll-up type capacitors of Examples 5, 7, 8, 10, 12, 21, and 22 having a ratio L/W of 4 or larger and including the two or more cylindrical parts had a low resistance of 2.5Ω or lower at the frequency of 10 MHz. On the other hand, the roll-up type capacitor of Example 20 having a ratio L/W of 4.0 and including only the one cylindrical part had a high resistance of 5.0Ω at the frequency of 10 MHz. Each of the roll-up type capacitors of Examples 18 and 19 having a ratio L/W of 3.0 and including the three or more cylindrical parts had a low resistance of 2.5Ω or lower at the frequency of 10 MHz. On the other hand, the roll-up type capacitor of Example 17 having a ratio L/W of 3.0 and including only the two cylindrical parts had a high resistance of 3.3Ω at the frequency of 10 MHz. Each of the roll-up type capacitors of Examples 11 and 16 having a ratio L/W of 2.0 and including the four or more cylindrical parts had a low resistance of 2.5Ω or lower at the frequency of 10 MHz. On the other hand, each of the roll-up type capacitors of Examples 1, 3, 6, 9, 14, and 15 having a ratio L/W of 2.0 and including the three or fewer cylindrical parts had a high resistance of 3.3Ω or higher at the frequency of 10 MHz. The roll-up type capacitor of Example 25 having a ratio L/W of 1.0 and including the eight cylindrical parts had a low resistance of 2.5Ω at the frequency of 10 MHz. On the other hand, each of the roll-up type capacitors of Examples 2, 4, 13, 23, and 24 having a ratio L/W of 1.0 or larger and smaller than 2.0 and including fewer than eight cylindrical parts had a high resistance of 3.3Ω or higher at the frequency of 10 MHz. As apparent from the results shown in Table 1, the roll-up type capacitor within the scope of the present invention is capable of sufficiently decreasing ESR. More specifically, in the case of the roll-up type capacitor having a configuration shown in Examples, each of the roll-up type capacitors of Examples 5, 7, 8, 10 through 12, 16, 18, 19, 21, 22, and 25 within the scope of the present invention could exhibit decreased ESR at the frequency of 10 MHz to 2.5Ω or lower. Moreover, defects decreased in each of the roll-up type capacitors of the respective examples described above within the scope of the present invention. It is considered that this decrease in defects was achieved by the length L of the laminate of 3 mm or smaller.

(Measurement of Capacitance and Impedance)

Figure 12:
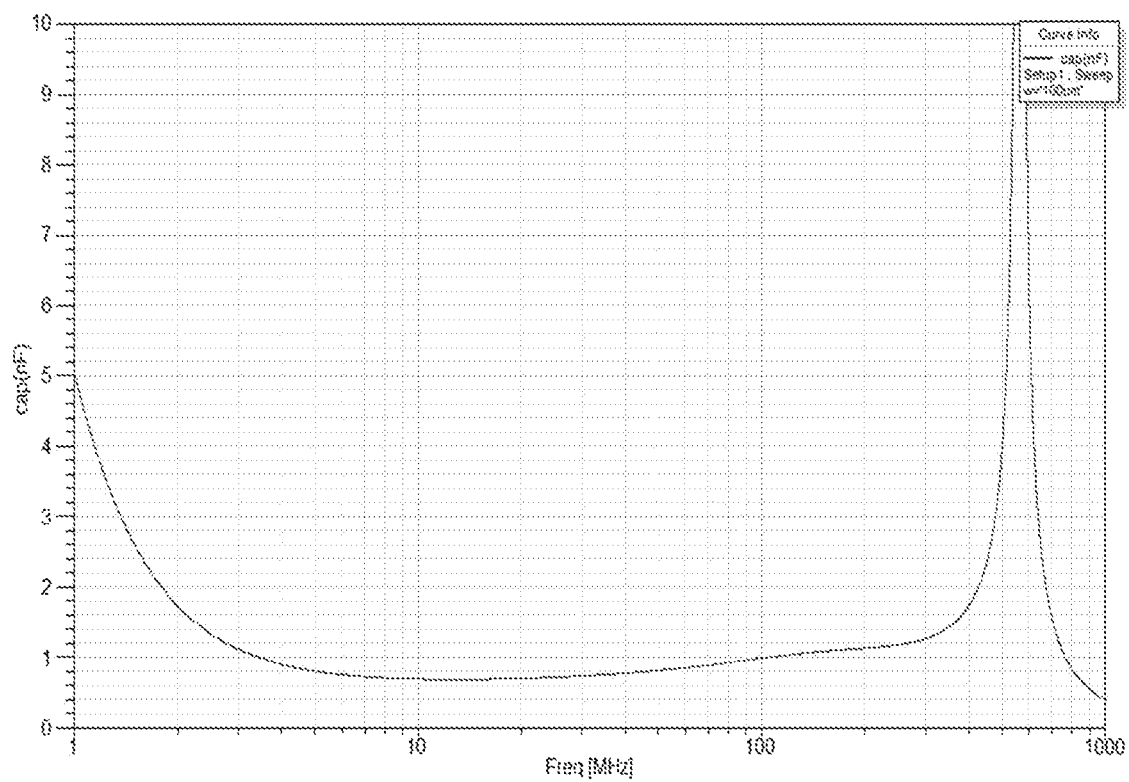
FIG. 12 is a graph showing a measurement result of frequency characteristic of electrostatic capacity for the roll-up type capacitor of Example 1.
Figure 13:
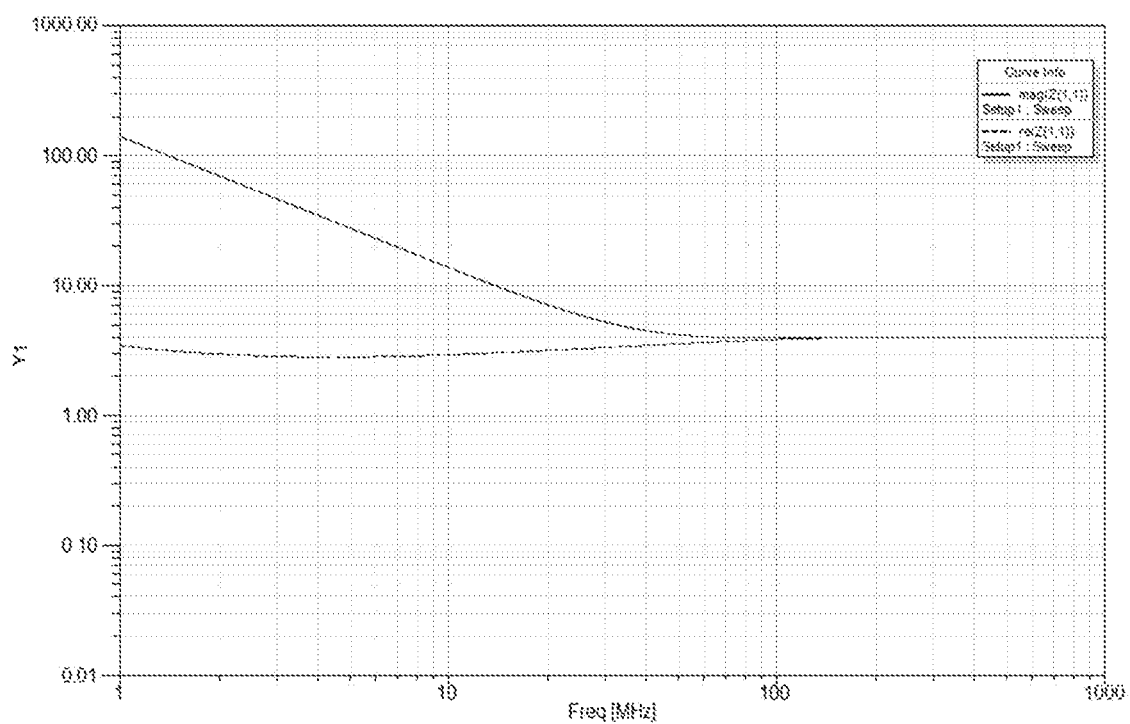
FIG. 13 is a graph showing a measurement result of frequency characteristic of impedance for the roll-up type capacitor of Example 1.
Figure 14:
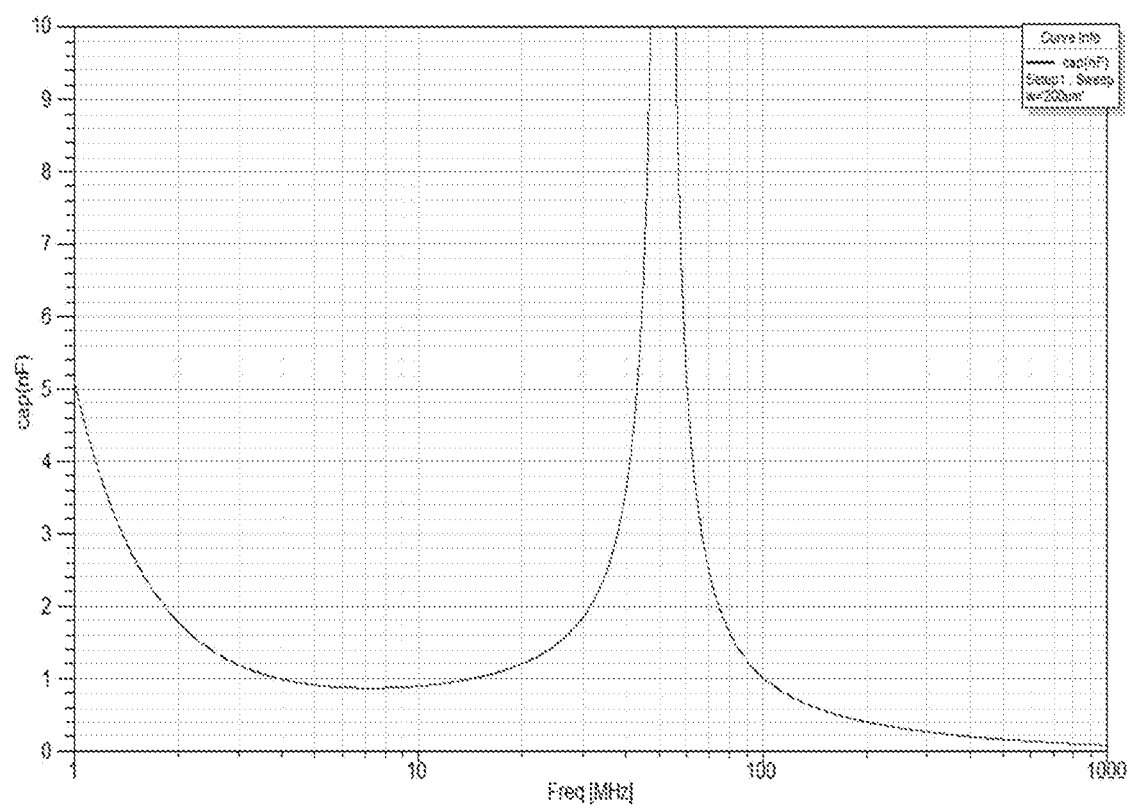
FIG. 14 is a graph showing a measurement result of frequency characteristic of electrostatic capacity for the roll-up type capacitor of Example 5.
Figure 15:
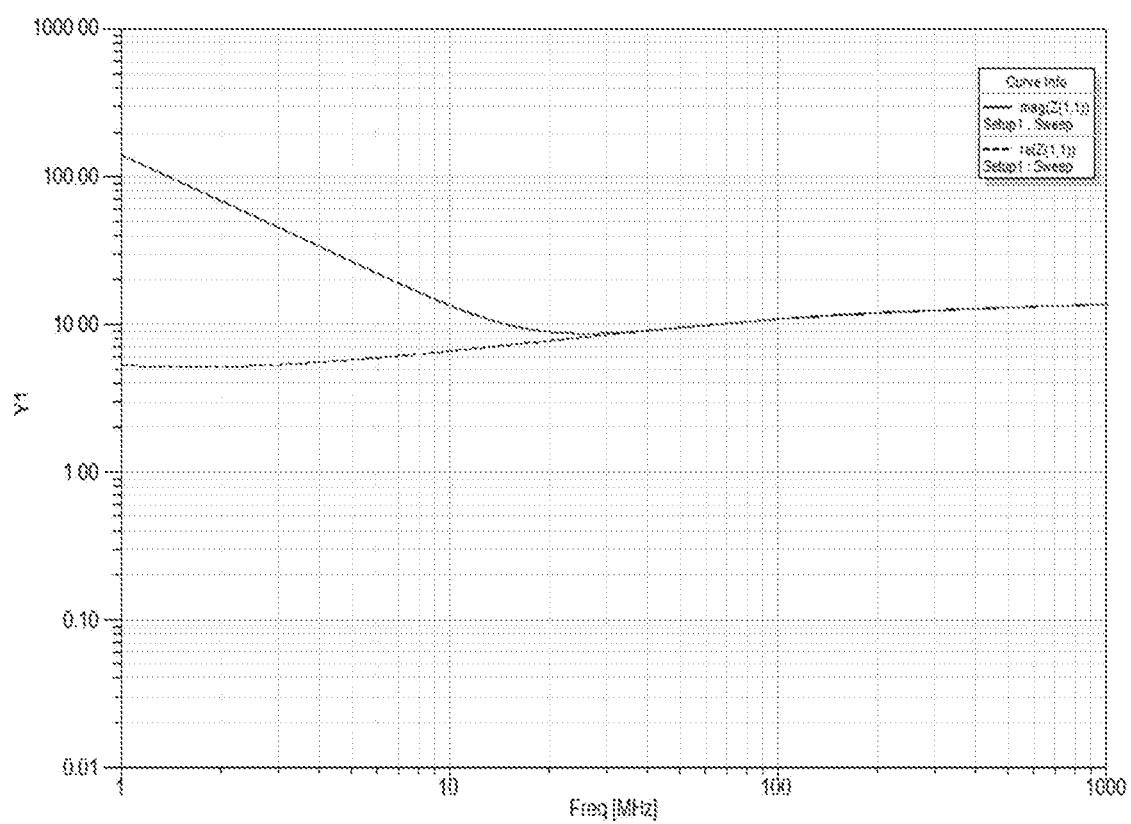
FIG. 15 is a graph showing a measurement result of frequency characteristic of impedance for the roll-up type capacitor of Example 5.

Capacitance and an impedance curve were obtained for each of the roll-up type capacitor of Example 1 and Example 5 by using an impedance analyzer. FIGS. 12 and 13 show measurement results of the capacitance and the impedance of the roll-up type capacitor of Example 5, while FIGS. 14 and 15 show measurement results of the capacitance and the impedance of the roll-up type capacitor of Example 1.

As shown in FIG. 12, the roll-up type capacitor of Example 5 having a ratio L/W of 4.0 and including the two cylindrical parts arranged in parallel with one another had high capacitance of approximately 1 nF or higher even in a high frequency range exceeding 100 kHz. On the other hand, as shown in FIG. 14, the roll-up type capacitor of Example 1 having a ratio L/W of 2.0 and including only the one cylindrical part had capacitance lower than 1 nF in a high frequency range exceeding 100 kHz. As illustrated in FIGS. 13 and 15, the roll-up type capacitor of Example 5 had lower inductance than the inductance of the roll-up type capacitor of Example 1, and had a resonant frequency in a higher frequency range. As a result, the roll-up type capacitor of Example 5 had lower impedance than the impedance of the roll-up type capacitor of Example 1 for alternating current at a high frequency.

The capacitor provided according to the present invention is a small-sized, low ESR and low ESL capacitor. Accordingly, the capacitor according to the present invention is appropriate for use even in a high frequency range, and therefore appropriate for use as a capacitor equipped on various types of electronic devices required to achieve size reduction and high performance.

REFERENCE SIGNS LIST

1: Roll-up type capacitor
2: Cylindrical part
4: First external electrode
6: Second external electrode
8: Resin part
10: Laminate
12: Lower electrode layer
14: Dielectric layer
16: Upper electrode layer 18: Insulating layer
21: Second dielectric layer
22: Third electrode layer
24: Part
25: Diffusion-preventing layer
26: Adhering layer
27: Interfacial layer
32: Substrate
34: Sacrificial layer
36: Photoresist
38: Photoresist pattern
40: Sacrificial layer pattern
42: Photoresist

The invention claimed is:

1. A roll-up type capacitor comprising:
a plurality of cylindrical parts arranged parallel to one another, each of the cylindrical parts being a rolled-lip laminate comprising at least a lower electrode layer, an upper electrode layer and a dielectric layer between the upper electrode layer and the lower electrode layer, the upper electrode layer being drawn to a first end of the cylindrical part, and the lower electrode layer being drawn to a second end of the cylindrical part;
a first external electrode on the first ends of each of the plurality of cylindrical parts and electrically connected to the respective upper electrode layers in the plurality of cylindrical parts; and
a second external electrode on the second ends of each of the plurality of cylindrical parts and electrically connected to the respective lower electrode layers in the plurality of cylindrical
wherein, before being rolled-up, when a first dimension of the laminate parallel to a rolling-up direction thereof is a length L, a second dimension of the laminate perpendicular to a laminating direction and the rolling-up direction thereof is a width W, and a ratio L/W is 1 or more,
the roll-up type capacitor comprises two or more cylindrical parts when the ratio L/W is 4 or more;
the roll-up type capacitor comprises three or more cylindrical parts when the ratio L/W is 3 or more and less than 4;
the roll-up type capacitor comprises four or more cylindrical parts when the ratio L/W is 2 or more and less than 3; and
the roll-up type capacitor comprises eight or more cylindrical parts when the ratio L/W is 1 or more and less than 2;
wherein the length L is 3 mm or less.

2. The roll-up type capacitor according to claim 1 wherein a thickness of the cylindrical part is 100 μm or less.

3. The roll-up type capacitor according to claim 1, further comprising a diffusion-preventing layer located within the laminate such that, before being rolled-up, the diffusion-preventing, layer, the lower electrode layer, the dielectric layer and the upper electrode layer are laminated in this order.

4. The roll-up type capacitor according to claim 3, further comprising an adhering layer between the diffusion-preventing layer and the lower electrode layer.

5. The roll-up type capacitor according to claim 1, further comprising a first interfacial layer between the dielectric layer and the upper electrode layer and a second interfacial layer between the dielectric layer and the lower electrode layer.

6. The roll-up type capacitor according to claim 1, further comprising an interfacial layer between the dielectric layer and the upper electrode layer.

7. The roll-up type capacitor according to claim 1, further comprising an interfacial layer between the dielectric layer and the lower electrode layer.

8. The $_{roll-up}$ type capacitor according to claim 1, further comprising an insulating layer located within the laminate such that, before being rolled-up, the insulating layer, the lower electrode layer, the dielectric layer and the upper electrode layer are laminated in this order.

9. The roll-up type capacitor according to claim 1, further comprising a second dielectric layer and a third electrode layer located within the laminate such that, before being rolled-up, the lower electrode layer, the dielectric layer, the upper electrode layer, the second dielectric layer and the third electrode layer are laminated in this order.

10. The roll-up type capacitor according to claim 1, wherein the cylindrical parts are embedded in. a resin.

11. A process for producing a roll-up type capacitor comprising:
forming a sacrificial layer on a substrate;
forming a plurality of laminates on the sacrificial layer, each laminate comprising at least a lower electrode layer, an upper electrode layer and a dielectric layer between the lower electrode layer and the upper electrode layer;
removing the sacrificial layer;
rolling up the plurality of laminates to obtain a plurality of cylindrical parts;
arranging the plurality of cylindrical parts parallel to one another;
forming a first external electrode on respective first ends of the plurality of cylindrical parts such that the first external electrode is electrically connected to the respective upper electrode layers; and
forming a second external electrode on respective second ends of the plurality of cylindrical parts such that the second external electrode is electrically connected to the respective lower electrode layers,
wherein, before being rolled-up, when a first dimension of the laminate parallel to a rolling-up direction thereof is a length L, and a second dimension of the laminate perpendicular to a laminating direction and the rolling-up direction thereof is a width W, and a ratio LAN is 1 or more,
the roll-up type capacitor comprises two or more cylindrical parts when the ratio L/W is 4 or more;
the roll-up type capacitor comprises three or more cylindrical parts when the ratio L/W is 3 or more and less than 4;
the roll-up type capacitor comprises four or more cylindrical parts when the ratio L/W is 2 or more and less than 3; and
the roll-up type capacitor comprises eight or more cylindrical parts when L the ratio /W is 1 or more and less than 2;
wherein the length L is 3 mm or less.

12. The process according to claim 11, wherein the forming of the laminate comprises forming a diffusion-preventing layer, the lower electrode layer, the dielectric layer and the upper electrode layer in this order.

13. The process according to claim 11, wherein the forming of the laminate comprises forming a diffusion-preventing layer, an adhesion layer, the lower electrode layer, the dielectric layer and the upper electrode layer in this order.

14. The process according to claim 11, wherein the forming of the laminate comprises forming the lower electrode layer, the dielectric layer, an interfacial layer and the upper electrode layer in this order.

15. The process according to claim 14, wherein the forming of the laminate comprises forming the lower electrode layer, a first interfacial layer, the dielectric layer, a second interfacial layer and the upper electrode layer in this order.

16. The process according to claim 11, wherein the forming of the laminate comprises forming an insulating layer, the lower electrode layer, the dielectric layer and the upper electrode layer in this order.

17. The process according to claim 11, wherein the forming of the laminate comprises forming the lower electrode layer, the dielectric layer, the upper electrode layer, a second dielectric layer and a third electrode layer in this order.

18. The process according to claim 11, further comprising hardening the plurality of cylindrical parts with a resin before forming the first external electrode and the second external electrode.

* * * * *